Sept. 27, 1938.  A. E. NORTHUP  2,131,116
VEHICLE CONSTRUCTION
Filed Jan. 19, 1937  4 Sheets-Sheet 1

Inventor
Amos E. Northup
By Braselton, Whitcomb & Davies
Attorney

Sept. 27, 1938.  A. E. NORTHUP  2,131,116
VEHICLE CONSTRUCTION
Filed Jan. 19, 1937  4 Sheets-Sheet 2
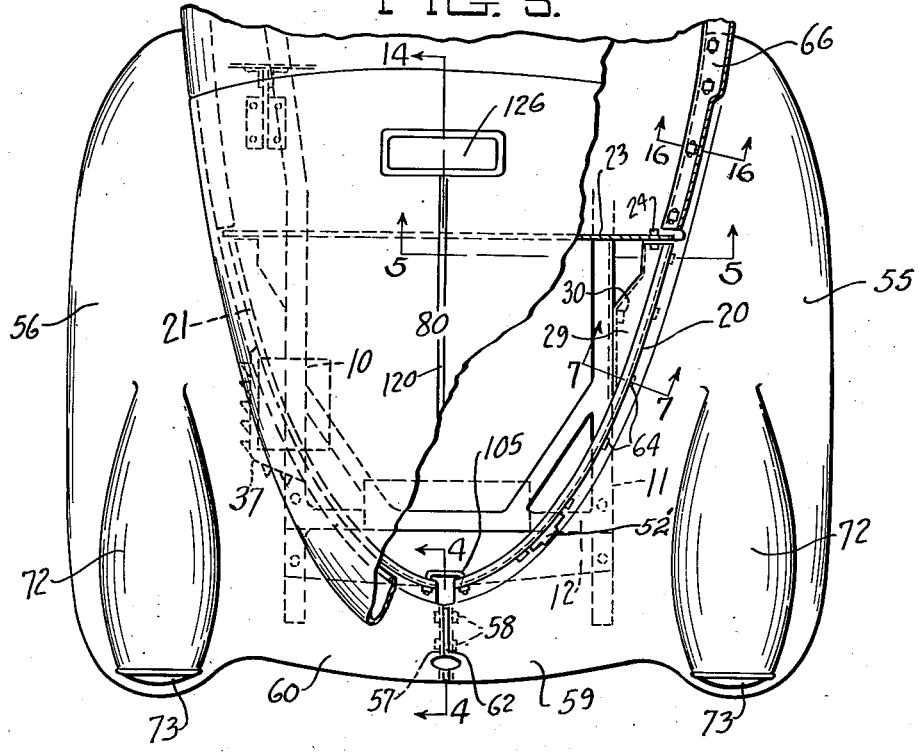
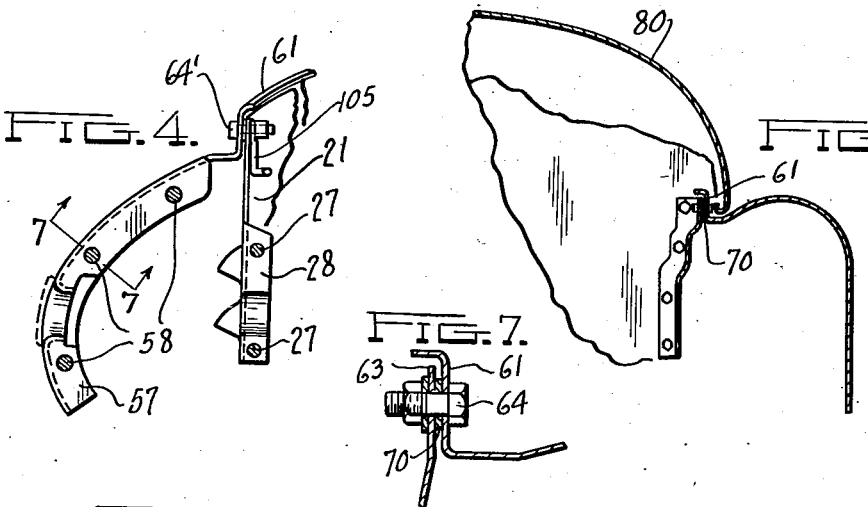
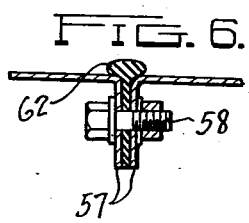
Inventor
Amos E. Northup
By Braselton, Whitcomb Davies
Attorney Sept. 27, 1938. A. E. NORTHUP 2,131,116
VEHICLE CONSTRUCTION
Filed Jan. 19, 1937 4 Sheets-Sheet 3
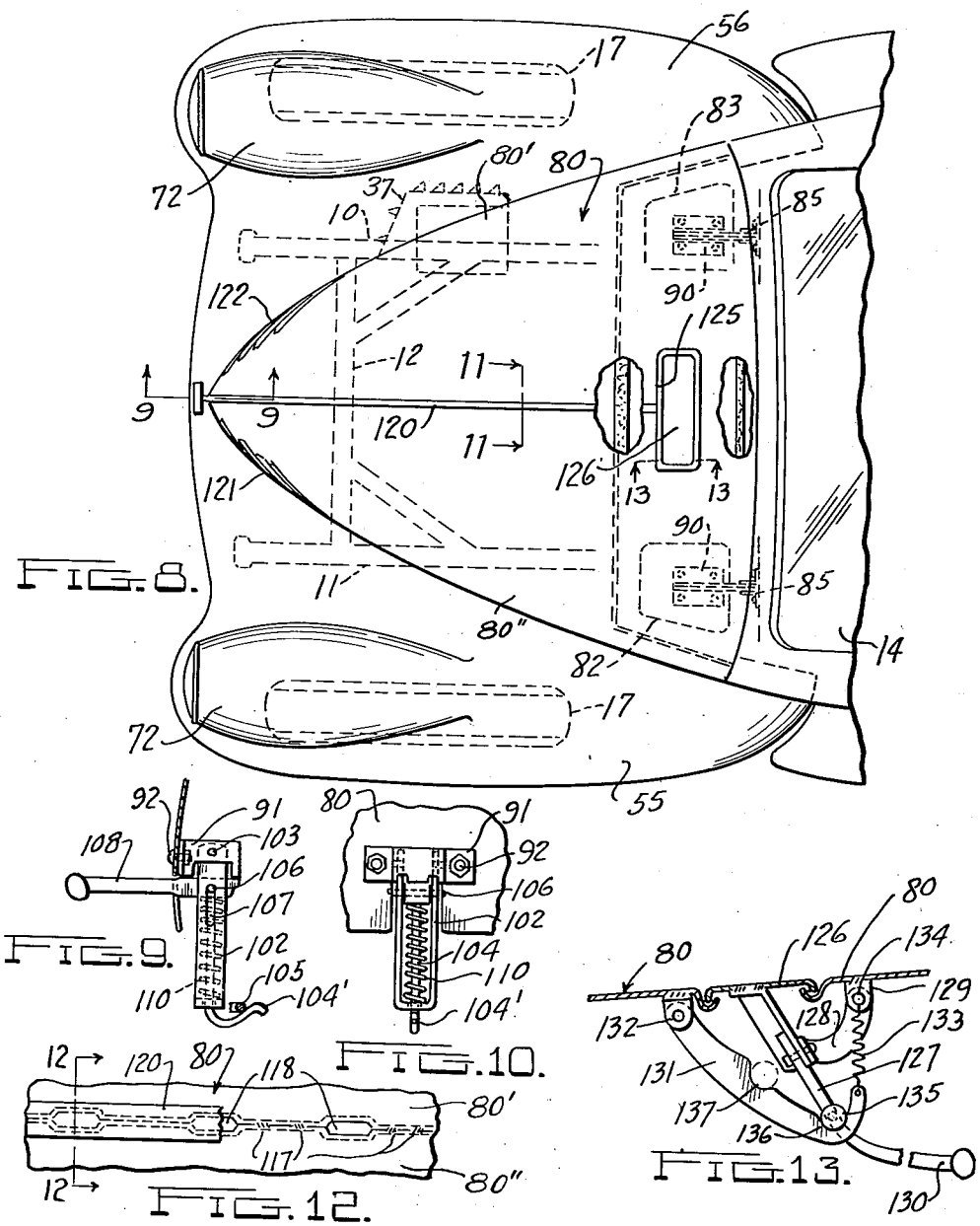
Inventor
Amos E. Northup
By Braselton, Whitcomb & Davies
Attorney

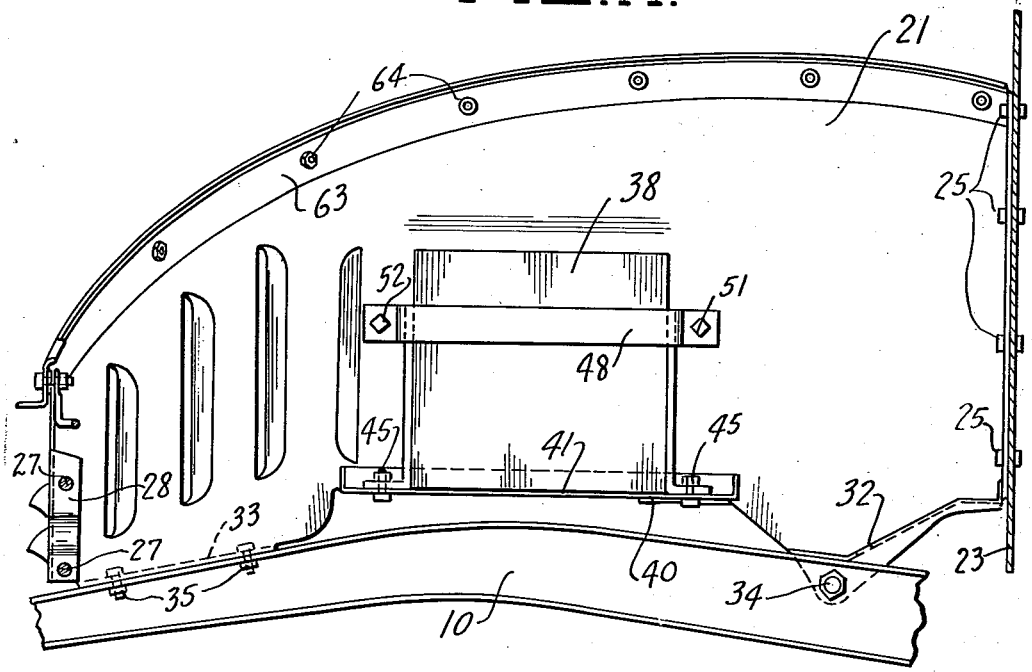
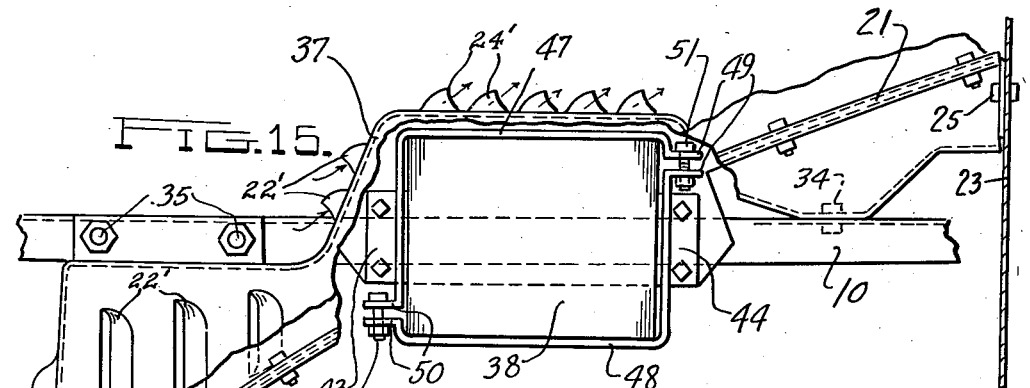
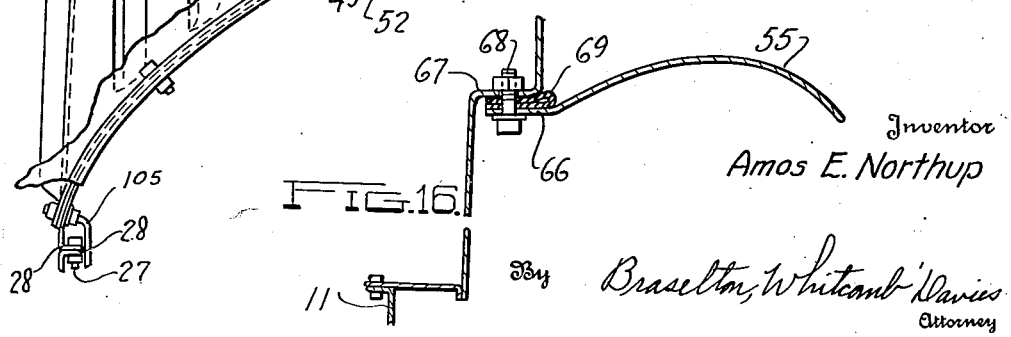

Patented Sept. 27, 1938

2,131,116

UNITED STATES PATENT OFFICE 2,131,116

VEHICLE CONSTRUCTION

Amos E. Northup, Detroit, Mich., assignor to Willys-Overland Motors, Inc., Toledo, Ohio, a corporation of Delaware Application January 19, 1937, Serial No. 121,352

18 Claims. (Cl. 180—69)

This invention relates to a vehicle construction and more particularly to the arrangement of engine enclosure construction and associated elements of an automotive vehicle.

The invention embraces an improved motor enclosure and fender construction for vehicles in which a bonnet is movably connected adjacent a cowl portion of the vehicle for upward movement permitting ready access to the engine and associated devices.

The invention also embraces the provision of relatively stationary side panels forming a part of the enclosure construction and arranged to be secured together at a forward portion of the vehicle and to the vehicle body proper so as to maintain a high degree of rigidity for these elements. The fabrication of side panels of this character provides a mounting means for the vehicle fenders whereby the fenders may be held rigidly without the use of brackets or other projecting supporting devices.

Another object of the invention is the provision of fender construction for the forward portion of an automotive vehicle wherein the fenders are connected together at the forward central portion of the vehicle and to stationary side panels so that the conventional splasher plate construction is formed as an integral part of each fender, thus greatly simplifying the manufacture and assembly of the fender construction of the vehicle. The arrangement of connecting the fenders together not only permits the fabrication of fender construction of pleasing design but also greatly enhances the rigidity of the fenders.

A further object of the invention resides in the arrangement of mounting the movable bonnet to engage sound deadening material preventing rattles and other noises by reason of vibration of the vehicle in use.

A further feature of the invention resides in the provision of means for mounting the storage battery or accumulator in the vehicle motor compartment wherein one of the side panels forming a part of the motor enclosure also forms a portion of the support for the storage battery thus providing a readily accessible position for a storage battery.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings of a form of the invention, which may be preferred, in which:

Figure 3 is a top plan view showing part of the bonnet construction broken away to illustrate the arrangement of securing the fenders and side panels together;

Figure 4 is an enlarged detail sectional view taken substantially on the line 4—4 of Figure 3;

Figure 5 is a fragmentary transverse sectional view taken substantially on the line 5—5 of Figure 3;

Figure 6 is an enlarged sectional view taken substantially on the line 6—6 of Figure 4;

Figure 7 is a fragmentary sectional view taken substantially on the line 7—7 of Figure 3;

Figure 8 is a top plan view of the construction as shown in Figure 2;

Figure 9 is a fragmentary detail sectional view taken on the line 9—9 of Figure 8 showing a form of locking arrangement for holding the bonnet in normal or closed position;

Figure 10 is a side view of the arrangement shown in Figure 9;

Figure 11 is a fragmentary detail sectional view taken substantially on the line 11—11 of Figure 8;

Figure 12 is a top plan view of a portion of the bonnet shown in section in Figure 11 with the finishing strip removed;

Figure 13 is a detail sectional view taken substantially on the line 13—13 of Figure 8;

Figure 14 is a longitudinal vertical sectional view taken substantially on the line 14—14 of Figure 3;

Figure 15 is a plan view of one of the side panels in the portion of the vehicle frame particularly illustrating the storage battery mounting;

Figure 16 is a fragmentary vertical sectional view taken substantially on the line 16—16 of Figure 3.

Figure 1:
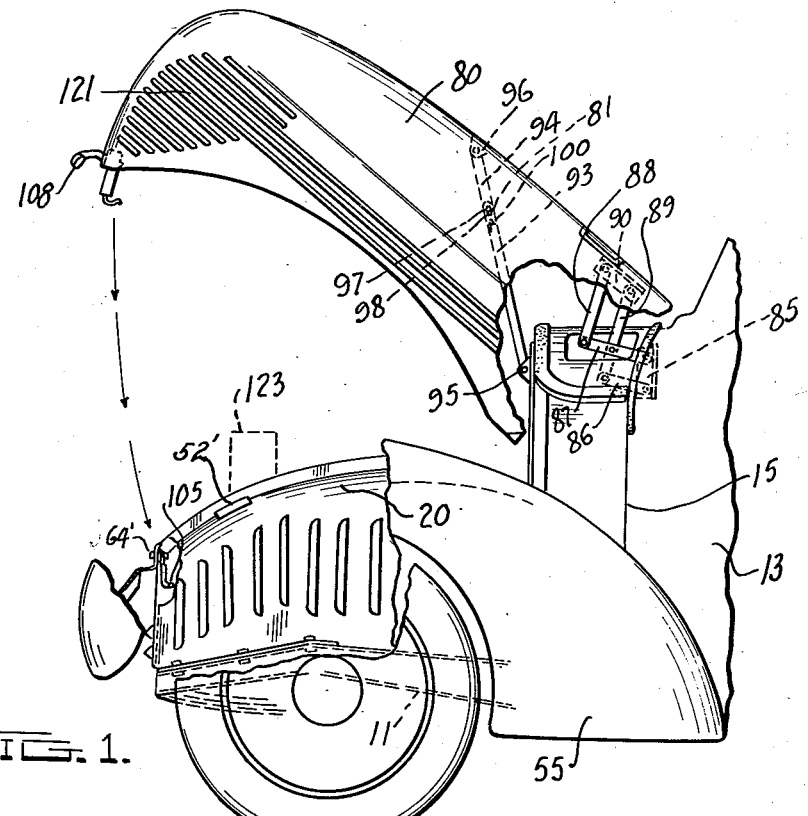
Figure 1 is a side elevational view of the forward portion of the vehicle illustrating the arrangement of parts with the bonnet in elevated position.
Figure 2:
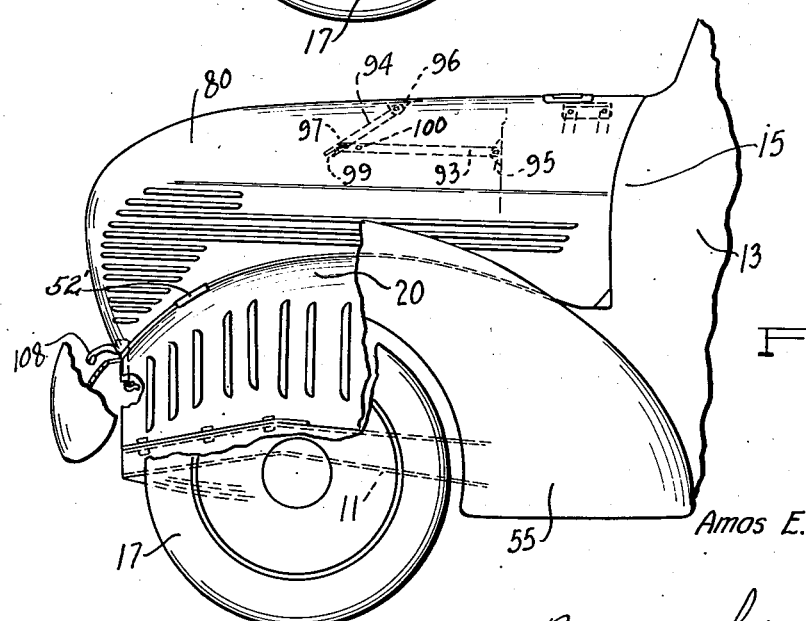
Figure 2 is a view similar to Figure 1 showing the bonnet in closed or normal position.

Referring to the drawings in detail and particularly Figures 1 to 3 inclusive, the forward portion of a vehicle embodying my invention is illustrated having a frame construction inclusive of channel members 10 and 11 joined together by transverse frame member 12 upon which is mounted the body 13 and power transmission units (not shown). Numeral 14 designates the wind shield of the vehicle and 15 indicates the cowl portion of the body. The vehicle is provided with the usual undergear including wheels 17 (the forward wheels only being illustrated) which are connected to the frame construction by an axle (not shown) or other conventional means.

The engine enclosure construction is inclusive of relatively stationary side panel members 20 and 21, each panel being secured to the dashboard 23 by means of bolts at 24 and 25 or other suitable means, and extends forwardly and convergingly, the panels being connected together at their forward extremities by suitable securing means 27 passing through openings in mating flanges 28 formed at the forward extremities of the panels. Panel 20 is formed with an inwardly projecting flange portion 29 which is secured to the frame by bolts 30, thus providing a rigid construction between panel 20 and frame member 11. Panel 21 is formed with flanges 32 and 33 which are adapted to be secured to frame member 10 by securing means 34 and 35.

The panel 21 is also provided with a projecting recess 37 as particularly illustrated in Figure 15 which provides a space to accommodate a storage battery or accumulator illustrated at 38. The side panel 21 has a horizontal flange portion 40 upon which is mounted a platelike member 41 forming the storage battery support. Means are provided for holding the battery in position comprising brackets 43 and 44 which are secured to the plate 41 by means of bolts 45, the upper extremities of the brackets supporting straplike members 47 and 48 having pairs of mating ear portions 49 and 50 which are adapted to be drawn together by means of bolts 51 and 52 thus tightening the straps 47 and 48 about the battery to hold the latter in a fixed position.

In the embodiment of my invention illustrated, the front fenders 55 and 56 are formed at their innermost forward portions with flanges 57 which are joined together by means of bolts 58 or other suitable means substantially at a plane passing through the central longitudinal axis of the vehicle, there being interposed between the flanges a gasket 62 of non-metallic material to prevent squeaks. By this construction the forward portions of the fender designated 59 and 60 together also form a splasher plate construction. Each fender is provided with an upwardly extending flange 61 which is shaped to coincide or mate with a flange portion 63 formed on each of the side panels 20 and 21, the flanges of the side panels and those of the fenders being joined together by means of a series of bolts 64 or other suitable securing means. The rear portions of each fender are also provided with flanges 66 (see Figure 16) which are positioned adjacent an offset or ledge 67 formed in the cowl or body portion of the vehicle, the fenders being secured to the ledges by means of bolts 68 or other suitable securing means. In order to eliminate metal to metal contact to reduce noise, a gasket 69 of rubber or other suitable material is interposed between the fender and the ledge 67. Gaskets 70 are also provided which are positioned between the flanges 61 of the fenders and the flanges 63 of the side panels in order to prevent squeak and noise. In the particular fender construction as illustrated, each fender is provided with a raised portion 72 which forms a housing for a headlamp, the lenses of the lamps being shown as at 73.

The side panels 20 and 21 form part of the vehicle engine or motor enclosure and positioned to complete the enclosure is a bonnet or hood member 80 which is mounted in a manner to be swung upwardly in order to permit ready access to the engine (not shown) for purposes of repair or replacement. The side panels are preferably provided with sets of louvers 22' and 24' arranged so that the louvers 22' tend to direct air into the engine compartment while louvers 24' tend to cause a withdrawal of air from the engine compartment, thus enhancing the circulation of air about the battery and vehicle engine. Arranged in the cowl portion of the vehicle body are spaced compartments 82 and 83 which are adapted to each accommodate fixedly supported brackets 85 to which are connected a pair of links 86 and 87. The links 86 and 87 are connected to a second pair of links 88 and 89, the latter in turn being pivoted to brackets 90 which are welded or otherwise secured to the bonnet 80 as shown in Figures 1 to 3. Links 87 and 89 are also pivoted together intermediate their extremities as illustrated in Figure 1. It will therefore be apparent that this construction of hingedly securing the bonnet to the cowl portion of the vehicle permits the rear portion of the bonnet, when the latter is swung upwardly as illustrated in Figure 1, to move away from the cowl portion of the vehicle, thus preventing the rear portion of the bonnet from injuring the body finish when the bonnet is elevated.

In order to retain the bonnet 80 in raised or open position, there is provided a pair of connected links 93 and 94, link 93 being pivotally connected to a bracket 95 secured to the dash board 23 or a suitable portion of the vehicle, link 94 being connected to a bracket 96 secured to the bonnet. The links are pivoted together by means of pin 97 carried by link 93 and extending into a slot 81 in link 94. An extension 98 is formed as an integral part of link 94 and has a recess or groove 99, the recess 99 being adapted when the bonnet is in open position to engage with a stop pin 100 carried by link 93 so as to limit the pivotal movement of the links when they are in substantially straight line position. By this stop means, the bonnet is retained in raised position minimizing the possibility of inadvertent collapsing of the linkage which would otherwise permit the bonnet to move to closed position. The pivotal connection between pin 97 and slot 81 permits slight relative longitudinal movement of the links so that link 94 may be moved slightly longitudinally with respect to link 93 so as to disengage recess 99 from pin 100. The open position of the bonnet and straight line position of the linkage is indicated in Figure 1, while Figure 2 indicates the relative relation of the linkage with the bonnet in closed position, the latter resting upon rubber blocks 52' to prevent metallic contact of the bonnet with the fenders.

I have provided suitable locking means for retaining the bonnet in closed position which is inclusive of a U-shaped member 105 which is secured by nuts or other suitable means 64' to the flanges 61 of the fenders and the upper portions of the side panels 20 and 21 as particularly indicated in Figures 1 and 4.

As particularly shown in Figures 9 and 10, the bonnet at its lowermost forward portion carries a bracket 91 which is secured to the bonnet by means of bolts 92 or other suitable means and pivoted to the bracket by means of pin 103 and depending from the bracket is a U-shaped member 102. Positioned within the member 102 is a handle member 108 to which is fixedly secured a downwardly projecting rod 104 which projects through an opening in the bight portion of member 102, the rod having a hood-like projection 104'. The handle member 103 is maintained in proper relation with member 102 by means of a transversely extending pin 106 whose end portions project into longitudinally extending slots 107 in member 102. An expansive spring 110 is interposed between the handle portion 103 and the bight portion of the bracket 102 which exerts an upward force upon the handle 108 and consequently upon the rod 104 and its hook portion 104' so that the latter when the bonnet is in closed or locked position is in engagement with the bight portion of the U-shaped member 105.

In order to release the bonnet so that the same may be moved to elevated or open position, an upward movement of the handle 108 oscillates bracket 102 about pivot 103 to withdraw the hook-like portion 104' from engagement with the member 105 and further upward movement of the handle elevates the bonnet. When it is desired to lock the bonnet in closed position, it is only necessary to lower the bonnet through the medium of the handle 108 and when the bonnet is in its lowermost or closed position further downward movement of handle 108 causes slight oscillation of member 102 about its pivot 103, the inner extremity of the handle member 108 contacting with bracket 91 causes the rod 104 and its hook portion 104' to move downwardly and inwardly until the hook-like portion 104' engages member 105. The expansive pressure of spring 110 maintains the hook-like portion 104' in resilient frictional engagement with bracket 105 to lock the bonnet in closed position.

In the form of bonnet construction of my invention, I have illustrated the bonnet as made in two similarly formed sections 80' and 80" which are at their meeting edges provided with mating flanges 115 and 116 which are spotwelded together at spaced points as indicated at 117, the flanges being slightly separated at spaced intervals as illustrated in Figures 11 and 12 to form longitudinal openings 118 through which is adapted to project a series of ears 119 formed upon a finishing strip 120, the end portions of the ears being bent over as indicated in Figure 13 to hold the finishing strip 120 in proper position. The finishing strip 120 may be chromium plated or otherwise finished to present a pleasing appearance. The juncture of the two sections of the bonnet 80' and 80" is obscured from view by means of the finishing strip 120.

The side wall portions of the bonnet are provided with suitable sets of louvers 121 and 122 to admit air to pass into the engine compartment and through the cooling radiator, the position of the radiator being indicated in dotted lines as at 123 in Figure 1.

The bonnet 80 is provided with a rectangular opening 125 in the rear or cowl portion thereof which accommodates a similarly shaped rectangular ventilator closure 126 to which is welded an extension member 127 to which is secured a member 128 pivoted upon brackets 129 carried by the bonnet 80, the extension 127 having a manipulating handle portion 130 as illustrated in Figure 13. An arm 131 is pivoted upon brackets 132, the latter being welded to the bonnet, the other end of the arm 131 being connected by means of a spring 133 to the pivot pin 134 upon which member 128 is pivoted. The member 127 is provided with a circular projection 135 which rides upon the upper edge surface of member 131, which it will be noted has curved depressions 136 and 137 which define the open and closed positions of the ventilator 126 when the same is actuated by means of the handle portion 130, the spring 133 serving to at all times hold member 131 in contact with the projection 135. Thus, when it is desired to admit air to the interior of the vehicle body for ventilating purposes, it is only necessary to exert downward pressure upon the handle 130 opening the ventilator 126 by a movement around the pivot pin 134 and the projection 135 engaging with the depression 137 and the arm 131 serves to frictionally hold the ventilator in open position. It is to be noted that in this arrangement the closure 126 and operating means therefor are carried by the bonnet 80 so that when the latter is elevated, the ventilator closure and associated parts are also elevated with the bonnet.

It is apparent that within the scope of the invention, modifications and different arrangements may be made other than is herein disclosed, and the present disclosure is illustrative merely, the invention comprehending all variations thereof.

What I claim is:

1. In combination, a chassis frame; a pair of relatively stationary vertically arranged panel members secured to said frame, said panel members having their forward portions in close relationship; a fender arranged adjacent each of said panel members and secured thereto; said fenders having forwardly and laterally extending portions secured together centrally of said chassis frame; and a bonnet pivotally supported at its rear portion and arranged to form with said side panels an engine enclosure.

2. In combination, a chassis frame; a plurality of relatively stationary vertically arranged panel members secured to said frame, said panel members having their forward portions in close relationship; a fender arranged adjacent each of said panel members, said fenders having forwardly and laterally extending portions secured together substantially centrally of said chassis frame; and a movable bonnet arranged to form with said side panels an engine enclosure.

3. In combination, a chassis frame; relatively stationary vertically arranged panel members secured to said frame, said panel members having their forward portions in close relationship; a fender arranged adjacent each of said panel members, said fenders having forwardly and laterally extending portions secured together; and a bonnet arranged to form with said side panels an engine enclosure.

4. In combination, a chassis frame; a body construction secured to said frame including a cowl portion; a pair of convergingly arranged upstanding panel members secured to said frame, said panel members being secured together adjacent their converging portions; a pair of fenders, each of said fenders being secured to an upstanding panel and having a flanged portion, said flanged portions being secured together substantially adjacent a central longitudinal plane of the chassis frame, a bonnet cooperatively arranged with said panel members forming a vehicle engine enclosure, said bonnet being hingedly mounted adjacent the cowl portion; and means for retaining said bonnet in closed position.

5. In combination, a chassis frame; a body construction secured to said frame including a cowl portion; a plurality of upstanding panel members secured to said frame, said panel members being secured together at their front edges; a pair of fenders; each of said fenders being secured to an upstanding panel and having portions secured together adjacent a central longitudinal plane of the chassis frame; a bonnet cooperatively arranged with said panel members forming a vehicle engine enclosure, said bonnet being hingedly mounted adjacent the cowl portion.

6. In combination, a vehicle including a chassis frame; a body mounted on said frame having a cowl portion and a dash portion; upstanding panel members secured together and to said dash portion; said panel members being secured to said frame; a pair of fenders, each fender being secured to one of said panel members adjacent the upper portion thereof, said fenders having laterally extending portions joined together forming a front splasher plate; a bonnet pivotally secured adjacent the dash portion of the vehicle and arranged when in closed position to form with said panels an engine enclosure; means to secure said bonnet in closed position, said bonnet having louvers arranged in the side walls thereof for the passage of air through said engine enclosure.

7. In combination, a vehicle including a chassis frame; a body mounted on said frame having a cowl portion and a dash portion; upstanding panel members secured together and to said dash portion; means for securing said panel members to said frame; a pair of fenders, each fender being secured to one of said panel members adjacent the upper portion thereof, said fenders having laterally extending portions joined together adjacent the central longitudinal axis of the vehicle and forming together a front splasher plate; a bonnet pivotally secured adjacent the dash portion of the vehicle and arranged when in closed position to form with said panels an engine enclosure; means to secure said bonnet in closed position, said bonnet having louvers arranged in the side walls thereof for the passage of air through said engine enclosure.

8. In combination, a vehicle including a chassis frame; a body mounted on said frame including a dash panel; upstanding spaced panel members carried by said dash panel and secured together at their front edges; one of said panel members having an expanded portion to accommodate a storage battery; a support for the storage battery carried by said frame and positioned adjacent the expanded portion of said panel; and a bonnet forming with said panels an enclosure for the battery.

9. In combination, a vehicle including a chassis frame; a body mounted on said frame having a dash portion; upstanding spaced panel members secured together at their front edges and to said dash portion at their rear edges; means for securing said panel members to said frame; one of said panel members having an expanded portion to accommodate a storage battery; a support for the storage battery carried by said frame and positioned adjacent the expanded portion of said panel; and a pivotally supported bonnet forming with said panels an enclosure for the storage battery; and means for locking said bonnet in closed position.

10. In combination, a vehicle including a chassis frame; a body mounted on said frame; upstanding panel members secured to said frame, one of said panel members having an expanded portion to form a storage battery compartment; a support for the storage battery carried by said frame; said panel member adjacent the battery having louvers in its forward portion adapted to convey air into the battery compartment, said panel having louvers in the side wall adjacent the battery compartment for conveying air away from the battery compartment.

11. An engine compartment enclosure bonnet for automotive vehicles including a pair of substantially matched sections of sheet metal, each of said sections having a longitudinally extending flange, said flanges being secured together at spaced points and forming a plurality of spaced openings; a finishing strip positioned adjacent the juncture of said flanges and having portions projecting through the openings adjacent the flanges, said portions being distorted to hold the finishing strip adjacent the juncture of said sections.

12. An engine compartment enclosure bonnet for automotive vehicles including a pair of substantially matched sections of sheet metal, each of said sections having a lateral flange, said flanges being secured together at spaced points and forming a plurality of spaced openings adjacent said flanges; a strip overlapping the juncture of said flanges and having portions projecting through the spaced openings, said portions being bent to hold the strip in fixed position.

13. An engine compartment enclosure bonnet for automotive vehicles including a pair of substantially matched sections of sheet metal, said sections converging at their forward portions and secured together forming an apex; said sections having horizontally disposed louvers in the side walls thereof to admit the passage of air through the bonnet.

14. An engine compartment enclosure bonnet for automotive vehicles including a pair of substantially matched sections of sheet metal, each of said sections having a flange, said sections converging at their forward portions forming an apex and being secured together through said flanges, said sections having horizontally disposed louvers in the side walls thereof to admit the passage of air through the bonnet.

15. In combination, a chassis frame; a body carried on said chassis frame; a pair of relatively stationary side panel members secured to the frame, said panel members having their forward portions in close relationship; a pair of fenders, each secured to one of said panel members; a movable bonnet arranged to form with said side panels an engine enclosure, said bonnet being hingedly connected to said body whereby the bonnet may be elevated to raised position; a member positioned adjacent the forward portions of said panel members and secured thereto; and locking means carried by the forward portion of said bonnet and engageable with said member for locking said bonnet in closed position.

16. In combination, a chassis frame; a body carried on said chassis frame; a pair of relatively stationary side panel members secured to the frame, said panel members having their forward portions in close relationship; a pair of fenders, each secured to one of said panel members; a movable bonnet arranged to form with said side panels an engine enclosure, said bonnet being hingedly connected to said body whereby the bonnet may be elevated to raised position.

17. In combination, a vehicle including a chassis frame; a body mounted on said frame including a dash panel; upstanding spaced panel members carried by said dash panel and secured together at their front edges, one of said panel members having an outwardly expanded portion to accommodate a storage battery.

18. In combination, a vehicle including a chassis frame; a body mounted on said frame having a dash portion; upstanding panel members secured together at their forward extremities and to said dash portion at their rear extremities; a pair of fenders, each fender being secured to one of said panel members, said fenders having laterally extending portions joined together forming a front splasher plate.

AMOS E. NORTHUP.